United States Patent
Sakai

(10) Patent No.: US 8,933,659 B2
(45) Date of Patent: Jan. 13, 2015

(54) TERMINAL DEVICE AND CHARGING CONTROL METHOD

(75) Inventor: Daisuke Sakai, Tokyo (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 858 days.

(21) Appl. No.: 13/047,455

(22) Filed: Mar. 14, 2011

(65) Prior Publication Data

US 2011/0309787 A1 Dec. 22, 2011

Related U.S. Application Data

(60) Provisional application No. 61/355,742, filed on Jun. 17, 2010.

(51) Int. Cl.
*H02J 7/00* (2006.01)
*H01M 10/48* (2006.01)
*H01M 10/46* (2006.01)

(52) U.S. Cl.
CPC .......... *H01M 10/486* (2013.01); *H01M 10/488* (2013.01); *H01M 10/465* (2013.01)
USPC ....................................................... 320/101

(58) Field of Classification Search
USPC ....................................................... 320/101
See application file for complete search history.

(56) References Cited

U.S. PATENT DOCUMENTS 6,437,699 B1 * 8/2002 Hayakawa ............... 340/636.13
2009/0058353 A1 * 3/2009 Jung ............................ 320/101

FOREIGN PATENT DOCUMENTS

JP          6-46536         2/1994

OTHER PUBLICATIONS

Machine Translation of JP06-46536.*

* cited by examiner

*Primary Examiner* — Samuel Berhanu
(74) *Attorney, Agent, or Firm* — Oblon, Spivak, McClelland, Maier & Neustadt, L.L.P.

(57) ABSTRACT

A terminal device including a solar battery panel; a panel temperature-detection unit configured to detect a temperature measured near the solar battery panel; a power generation-state determination unit configured to detect an illuminance measured near the solar battery panel; a battery temperature-detection unit configured to detect a temperature measured near a secondary battery charged through power generated through the solar battery panel; a control unit configured to estimate a change in the temperature detected through the battery temperature-detection unit based on the temperature detected through the panel temperature-detection unit and the illuminance obtained through the power generation-state determination unit, and determine a remaining time when the estimated temperature measured near the secondary battery reaches a temperature at which the charging of the secondary battery is stopped; and a notification unit configured to provide notification about the remaining time determined through the control unit.

2 Claims, 4 Drawing Sheets

TERMINAL DEVICE AND CHARGING CONTROL METHOD

CROSS REFERENCE TO RELATED APPLICATIONS

This application is related to and claims priority under 35 U.S.C. §119(e) to Provisional Application Ser. No. 61/355,742, filed Jun. 17, 2010, the contents of which are hereby incorporated herein by reference.

BACKGROUND

1. Field

The present specification relates to a terminal device that can be applied for a mobile phone-terminal device and a charging control method applied for the terminal device, and particularly relates to a charging control technology applied for a device provided with a solar battery.

2. Description of the Related Art

In the field of terminal devices including a secondary battery, such as mobile phone-terminal devices, terminal devices provided with a solar battery panel have been put to practical use. When the terminal device provided with the solar battery panel is left at a place which is illuminated enough to ensure an appropriate amount of power generated through the solar battery panel, the secondary battery provided in the terminal device is charged. Therefore, the battery duration of the terminal device is increased, for example.

A charger of a secondary battery provided with a solar battery has been disclosed in Japanese Unexamined Patent Application Publication No. 06-46536. According to Japanese Unexamined Patent Application Publication No. 06-46536, each of the temperature of the secondary battery and that of the solar battery (the environmental temperature) is detected and charging is stopped when the value of the difference between the secondary battery temperature and the solar battery temperature reaches a predetermined temperature. The technology disclosed in Japanese Unexamined Patent Application Publication No. 06-46536 allows for preventing the secondary battery being charged in a high-temperature state undesirable for the characteristics of the secondary battery.

When a solar battery panel is mounted on a terminal device such as a mobile phone-terminal device, the solar battery panel should be charged in the following use state. Namely, the terminal device is usually placed near a window irradiated with the sunlight so that the solar battery panel is irradiated with the sunlight as much as possible.

However, when the terminal device is directly irradiated with the sunlight, the temperature of the terminal device itself is increased, which may cause problems. More specifically, the secondary battery and/or the circuit components that are provided in the terminal device may be deteriorated.

When a battery of which temperature should be detected during the charging is used as the secondary battery, control is performed to stop the charging when the detected secondary battery temperature reaches the charging stop temperature so that the charging is not performed in the high-temperature state. The battery of which temperature should be detected during the charging includes a lithium-ion storage battery, a nickel metal hydride-storage battery, and so forth.

Thus, the charging itself is stopped based on the temperature to ensure the safety of the secondary battery. However, when the terminal device itself is left at a place irradiated with the sunlight, the temperature of the terminal device itself is kept high, which may deteriorate the secondary battery and/or other circuit components that are provided in the terminal device, which is hardly appropriate for the terminal device.

BRIEF SUMMARY

Accordingly, the present specification has been made to solve a problem occurring when a terminal device provided with a solar battery panel is charged.

According to an embodiment, a terminal device is provided comprising: a solar battery panel; a panel temperature-detection unit configured to detect a temperature measured near the solar battery panel; a power generation-state determination unit configured to detect an illuminance measured near the solar battery panel; a battery temperature-detection unit configured to detect a temperature measured near a secondary battery charged through power generated through the solar battery panel; a control unit configured to estimate a change in the temperature detected through the battery temperature-detection unit based on the temperature detected through the panel temperature-detection unit and the illuminance obtained through the power generation-state determination unit, and determine a remaining time when the estimated temperature measured near the secondary battery reaches a temperature at which the charging of the secondary battery is stopped; and a notification unit configured to provide notification about the remaining time determined through the control unit.

According to another embodiment, a method is provided that is implemented on a terminal device having a solar battery panel and a secondary battery that is charged through power generated through the solar battery panel, the method comprising: detecting a temperature measured near the solar battery panel; detecting an illuminance measured near the solar battery panel; detecting a temperature measured near the secondary battery; estimating a change in the temperature measured near the secondary battery based on the temperature measured near the solar battery panel and the illuminance measured near the solar battery panel and determining a remaining time when the estimated temperature measured near the secondary battery reaches a temperature at which the charging of the secondary battery is stopped; and providing a notification about the determined remaining time.

According to another embodiment, a computer readable storage medium is provided that stores a program which, when executed by a terminal device having a solar battery panel and a secondary battery that is charged through power generated through the solar battery panel, causes the terminal device to perform a method comprising: detecting a temperature measured near the solar battery panel; detecting an illuminance measured near the solar battery panel; detecting a temperature measured near the secondary battery; estimating a change in the temperature measured near the secondary battery based on the temperature measured near the solar battery panel and the illuminance measured near the solar battery panel and determining a remaining time when the estimated temperature measured near the secondary battery reaches a temperature at which the charging of the secondary battery is stopped; and providing a notification about the determined remaining time.

The above-described configuration allows for a user of the terminal device to perceive an estimated time taken before the charging is stopped through the notification about the time when the temperature at which the charging of the secondary battery is stopped is attained. The notification about the time when the temperature at which the charging is stopped is attained can be performed by displaying data and/or outputting voice data, for example.

According to the embodiments described herein, the user of the terminal device can perceive an estimated time taken before the charging is stopped. Therefore, the user can perceive an estimated time for the solar irradiation of the terminal device. At the notified time, therefore, the user can move the terminal device to a place that does not get the sunlight, so as to prevent the terminal device from being kept in a high-temperature state.

DETAILED DESCRIPTION

Hereinafter, an embodiment will be described in the following order with reference to the attached drawings.

1. Exemplary configuration of Terminal device (FIGS. 1 and 2)
2. Exemplary processing procedures that are performed during Charging performed through Solar battery in Terminal device (FIGS. 3 and 4)
3. Specific examples that are observed during Charging performed through Solar battery in Terminal device (FIGS. 5, and 6A and 6B)
4. Example modifications

[1. Exemplary Configuration of Terminal Device]

Figure 1:
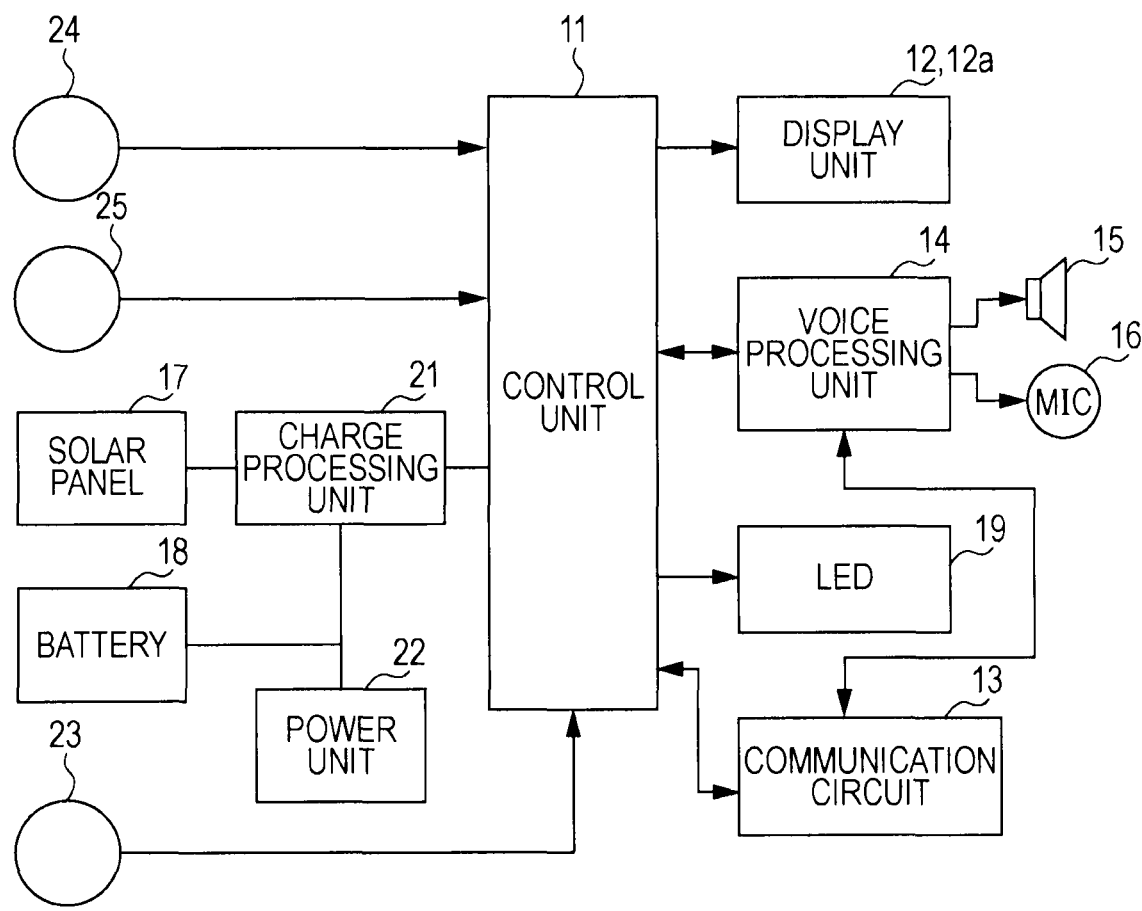
FIG. 1 is a block diagram illustrating an exemplary terminal device according to an embodiment.

First, an exemplary configuration of a terminal device according to an embodiment will be described with reference to FIGS. 1 and 2.

In the above-described embodiment, the exemplary configuration is used for a mobile phone-terminal device. That is to say, as illustrated in FIG. 2, a terminal device 10, including a first cabinet 10a and a second cabinet 10b that are openably/closably connected to each other through a connection part 10c, is attained. A display panel, operation keys, and so forth are provided on the inner faces (not shown) of the terminal device 10, where the inner faces are inwardly opposed to each other as illustrated in FIG. 2.

Figure 2:
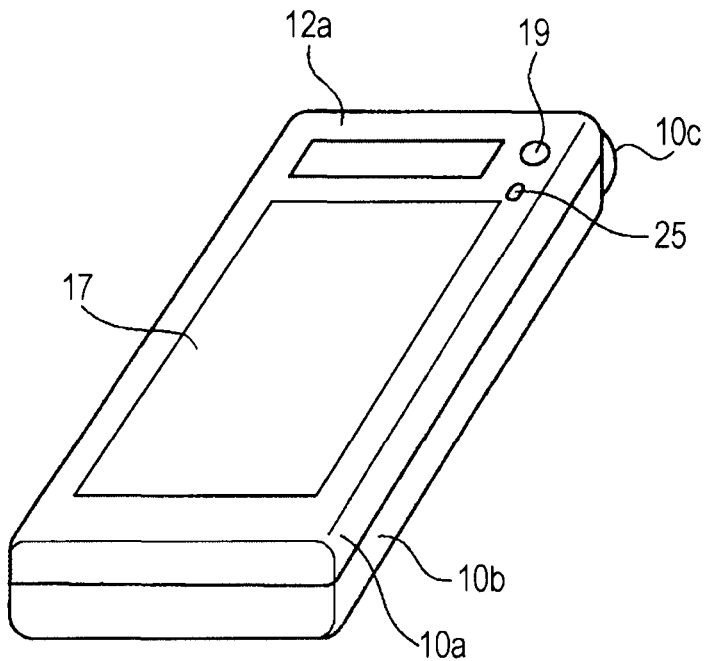
FIG. 2 is a perspective illustration of an exemplary terminal device according to an embodiment.

Moreover, as illustrated in FIG. 2, a solar battery panel 17 is provided on the outer face of the first cabinet 10a of the terminal device 10 to charge a secondary battery provided in the terminal device 10 through the solar battery panel 17.

Further, as illustrated in FIG. 2, a sub-display unit 12a and a light-emitting diode 19 are provided on the face of the terminal device 10, where the solar battery panel 17 is provided on the face. The sub-display unit 12a displays data and the light-emitting diode 19 lights up and/or flashes on and off so that a user is notified of various types of information. The sub-display unit 12a can display text data, graphic data, and so forth.

Further, a detection window of an illuminance sensor 25 is provided beside the solar battery panel 17 to detect the illuminance of light with which the solar battery panel 17 is irradiated.

Next, the internal configuration of the terminal device 10 will be described with reference to FIG. 1. The terminal device 10 includes a control unit 11 configured to control the operations of each of components. That is to say, the control unit 11 controls communications that are performed through a communication circuit 3 configured to perform radio communications that are appropriate for the terminal device 10 provided as a radio phone terminal. The control unit 11 transmits voice data acquired through the radio communications that are performed through the communication circuit 13 to a voice processing unit 14, and makes a speaker 15 connected to the voice processing unit 14 externally transmit the voice data. Further, the control unit 11 makes the voice processing unit 14 generate voice data based on a voice picked up through a microphone 16, and makes the communication circuit 13 transmit the voice data by radio.

Further, the display unit 12 and/or the sub-display unit 12a displays various types of information appropriate for the terminal device 10 provided as the radio phone terminal. For example, the display unit 12 and/or the sub-display unit 12a displays the data of a phone number, transmitted electronic mail, electronic mail for transmission, a web page, and so forth. The display unit 12 and/or the sub-display unit 12a performs the above-described display to notify the user of, for example, the time taken to charge the solar battery panel 17 that will be described later when information about the charging time is displayed as text data and/or graphic data.

The notification processing can also be performed through the light-emitting diode 19. That is to say, as illustrated in FIG. 2, the above-described configuration allows for notifying the user of some information by making the light-emitting diode 19 provided on the surface of the cabinet 10a of the terminal device 10 light up and/or flash on and off, for example.

The above-described terminal device 10 includes a secondary battery 18 and is operated by direct-current low-voltage power transmitted from a power unit 22 connected to the secondary battery 18. The secondary battery 18 includes, for example, a lithium-ion storage battery. The temperature of the secondary battery 18 is detected through a battery temperature-detection sensor 23 which is a battery temperature detection unit provided near the place where the secondary battery 18 is provided. The battery temperature-detection sensor 23 includes a thermistor which is an element of which resistance is changed in accordance with a temperature, for example. Then, the control unit 11 determines data of the secondary battery temperature detected through the battery temperature-detection sensor 23 to perform control at the charging time.

The secondary battery 18 is charged through the transmission of a charging current, which is performed through the charge processing unit 21 configured to transmit the charge current used to charge the secondary battery 18 based on an instruction transmitted from the control unit 11 so that the secondary battery 18 is charged.

The charge processing unit 21 charges the secondary battery 18 by using the power supply of an external power supply section such as an AC adaptor (not shown) when the external power supply section is connected to the secondary battery 18 and/or charges the secondary battery 18 by using power generated through the solar battery panel 17.

When charging the secondary battery 18 by using the power generated through the solar battery panel 17, the charge processing unit 21 performs processing such as suspending the charging under the control of the control unit 11. A panel temperature-detection temperature sensor 24 provided as a solar battery panel-temperature detection unit is arranged near the place where the solar battery panel 17 is provided so that the temperature of the solar battery panel 17 is detected. The panel temperature-detection temperature sensor 24 includes, for example, a thermistor and the control unit 11 determines data of the detected temperature.

An illuminance sensor 25 configured to detect the illuminance of light with which the solar battery panel 17 is irradiated is provided and the control unit 11 determines data of the detection performed through the illuminance sensor 25. The illuminance sensor 25 functions as a power generation-state determination unit of the solar battery panel 17. The control unit 11 calculates the amount of power generated through the solar battery panel 17 based on the illuminance of the irradiation light, the illuminance being detected through the illuminance sensor 25, and calculates data appropriate to perform the charging control.

[2. Exemplary Processing Procedures that are Performed During Charging Performed Through Solar Battery in Terminal Device]

Next, exemplary processing procedures that are performed to charge the secondary battery 18 through the use of the solar battery panel 17 in the terminal device of the above-described embodiment will be described with reference to flowcharts of FIGS. 3 and 4.

Figure 3:
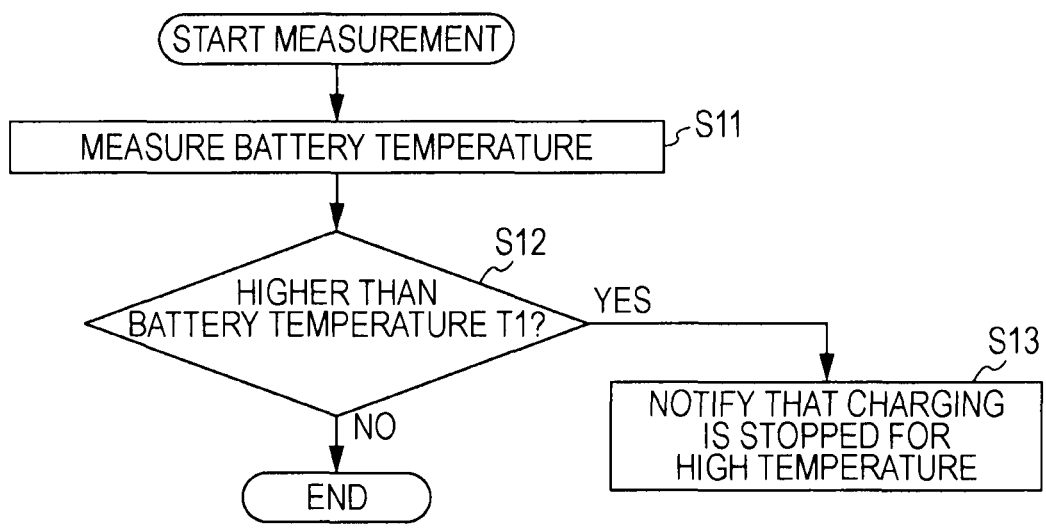
FIG. 3 is a flowchart illustrating exemplary charging control performed through a terminal device according to an embodiment.

First, for charging the secondary battery 18, the control unit 11 determines the temperature detected through the battery temperature-detection sensor 23 and performs control, as illustrated in the flowchart of FIG. 3. Control processing procedures that are illustrated in the flowchart of FIG. 3 are performed either when the secondary battery 18 is charged through the solar battery panel 17 or when the secondary battery 18 is charged through the power transmission performed by an external power source.

That is to say, while the secondary battery 18 is charged, the control unit 11 measures the temperature detected through the battery temperature-detection sensor 23 at step S11 as occasion arises, and determines whether or not the detected temperature exceeds a temperature T1 at which the charging should be stopped at step S12, as illustrated in the flowchart of FIG. 3. The temperature T1 is set to the highest of values falling within a range where the secondary battery 18 can be safely charged. Actually, however, the temperature T1 is set to a value adequately lower than the highest value to allow some leeway so that the terminal device 10 is not jeopardized immediately even though the detected temperature exceeds the temperature T1.

When it is determined that the detected temperature exceeds the temperature T1 at step S12, the supply of charging currents to the secondary battery 18 is stopped under the control of the control unit 11, so that the charging is stopped. When the charging is stopped, the display unit 12 and/or the sub-display unit 12*a* displays text data and/or graphic data to notify the user that the charging had been stopped for the high temperature at step S13. It may be configured that data of an instruction is transmitted to the voice processing unit 14 to notify the user that the charging had been stopped through a synthesized voice emitted from a speaker 15. Otherwise, a simple warning beep may be temporarily emitted.

When the detected temperature does not exceed the temperature T1 at step S12, the control unit 11 temporarily stops the measurement processing and waits until the next time the temperature measurement is performed at step S11. The temperature measurement corresponding to step S11 is performed constantly during the charging in a relatively short cycle of, for example, several seconds to several tens of seconds.

Figure 4:
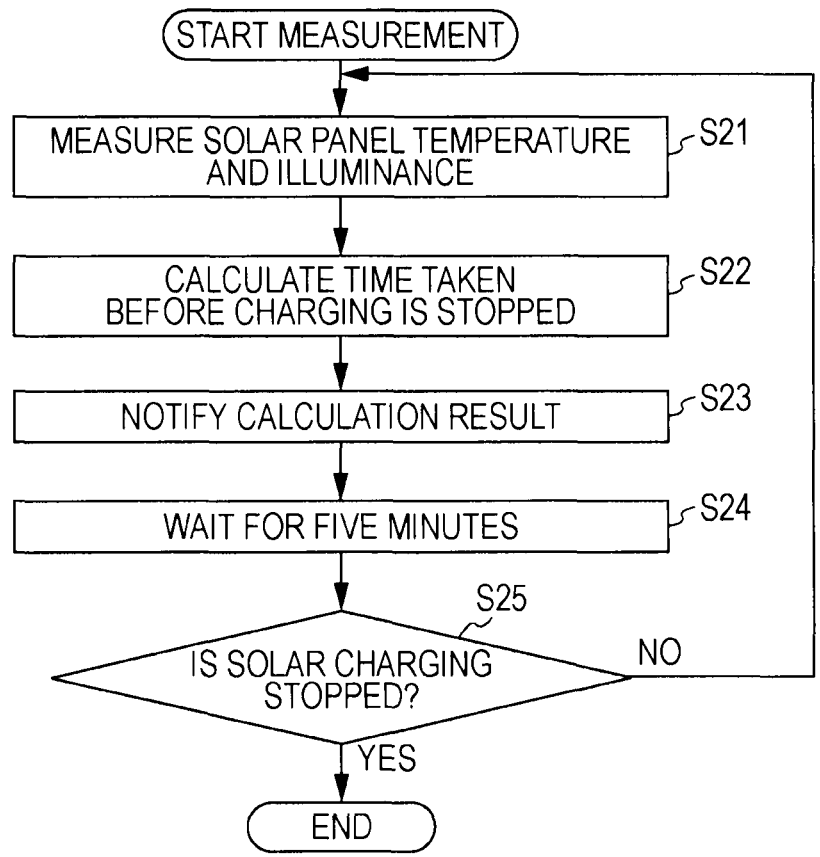
FIG. 4 is a flowchart illustrating exemplary processing performed in parallel with the charging control performed through a terminal device according to an embodiment.

During the charging performed through the solar battery panel 17, the control unit 11 performs control processing procedures that are illustrated in the flowchart of FIG. 4.

That is to say, as illustrated in FIG. 4, the control unit 11 determines the temperature detected through the panel temperature-detection temperature sensor 24 and the illuminance detected through the illuminance sensor 25 at step S21. Then, the control unit 11 acquires data of the time taken before the charging is stopped based on the detected temperature and illuminance at step S22. The data of the time taken before the charging is stopped is acquired with reference to data of a table illustrating the correspondence between the temperature and the illuminance, for example. An example of the correspondence table data will be described later.

Otherwise, a calculation formula of some kind may be prepared, and the current temperature and illuminance are substituted into the above-described calculation formula to calculate the time taken before the charging is stopped.

The time taken before the charging is stopped, which is acquired at step S22, is a time measured from the start point corresponding to the current temperature detected through the panel temperature-detection temperature sensor 24 to the time when the detected temperature reaches the charging stop temperature T1 in the case where the solar battery panel 17 is kept being irradiated with the sunlight at the current illuminance.

When acquiring the time taken before the charging is stopped at step S22, the current residual charge amount of the secondary battery 18 is also determined. When the time taken before the secondary battery 18 seems to be fully charged is shorter than that taken before the temperature T1 obtained based on the temperature and the illuminance is attained, the time taken before the charging is stopped is determined to be the time taken before the secondary battery 18 seems to be fully charged.

When the time taken before the charging is stopped is acquired at step S22, the user is notified of the acquired time at step S23. For example, the user is notified of the acquired time by making the sub-display unit 12*a* illustrated in FIG. 2 display the acquired time as numerical and/or text data. More specifically, the sub-display unit 12*a* displays data shown as "xx minutes till the completion of charging". Otherwise, when the first cabinet 10*a* and the second cabinet 10*b* that are illustrated in FIG. 2 are opened, the same display may be performed through an inner display unit 12 (not shown). The above-described display may be performed continually during the charging or may be performed only for several tens of seconds to a minute or around. Further, the light-emitting diode 19 may flash on and off to provide notification.

Still further, the speaker 15 may emit the voice data "XX minutes till the completion of charging" to notify the user of the time. However, when it is determined that the charging stop temperature is not attained, the above-described notification processing is not performed as described later.

After the above-described notification processing is performed (or when the above-described notification processing is not performed at step S23), the terminal device 10 waits for a predetermined time period at step S24. After that, it is determined whether or not the charging performed through the solar battery panel 17 is continued at step S25. In the above-described embodiment, the terminal device 10 waits for five minutes at step S24. When the charging performed through the solar battery panel 17 is continued, the processing returns to step S21, and the processing corresponding to steps S21 to S24 is performed again. Therefore, the time notified at step S23 becomes shorter each time the notification processing is renewed.

When it is determined that the charging performed through the solar battery panel 17 is stopped at step S25, the processing illustrated in the flowchart of FIG. 4 is finished.

Here, Table 1 illustrates the example of the table data indicating the correspondence between the temperature and illuminance of the solar battery panel 24, the correspondence being determined at step S22 shown in the flowchart of FIG. 4.

reach the charging stop temperature even though the charging is performed for hours. For example, when the current temperature detected through the panel temperature detection-temperature sensor 24 falls within the range of from 40° C. to 50° C. and the illuminance is 10000 lux or less, it is determined that the detected temperature does not reach the charging stop temperature even though the charging is performed for hours.

Here, each of the times that are shown in Table 1 is an exemplary time. The temperatures and the illuminances may be determined more closely to obtain the time taken before the detected temperature reaches the charging stop temperature in finer steps.

[3. Specific Examples that are Observed During Charging Performed Through Solar Battery in Terminal Device]

TABLE 1

| | | illuminance | | | | | |
|---|---|---|---|---|---|---|---|
| | | 0~ 10000 Lux | 10000~ 30000 Lux | 30000~ 50000 Lux | 50000~ 80000 Lux | 80000~ 100000 Lux | 100000 Lux~ |
| charging start-time temperature | 10° C. or less | not reaches stop temp | not reaches stop temp | not reaches stop temp | not reaches stop temp | not reaches stop temp | 150 min |
| | 10-20° C. | not reaches stop temp | not reaches stop temp | not reaches stop temp | not reaches stop temp | 150 min | 120 min |
| | 20-30° C. | not reaches stop temp | not reaches stop temp | not reaches stop temp | 150 min | 120 min | 90 min |
| | 30-40° C. | not reaches stop temp | not reaches stop temp | 150 min | 120 min | 90 min | 60 min |
| | 40-50° C. | not reaches stop temp | 120 min | 90 min | 60 min | 45 min | 30 min |
| | 50-50° C. | 60 min | 50 min | 40 min | 30 min | 20 min | 10 min |

Each of the charging start-time temperatures that are shown in the vertical direction at the left end of Table 1 is the temperature detected through the panel temperature-detection temperature sensor 24, and each of illuminances that are shown in the horizontal direction is the illuminance detected through the illuminance sensor 25.

As illustrated in Table 1, when the current temperature detected through the panel temperature detection-temperature sensor 24 falls within the range of from 40° C. to 50° C. and the illuminance falls within the range of from 10000 lux to 30000 lux, for example, it is determined that the detected temperature reaches the charging stop temperature in 120 minutes or around.

Further, when the current temperature detected through the panel temperature detection-temperature sensor 24 falls within the range of from 40° C. to 50° C. and the illuminance falls within the range of from 30000 lux to 50000 lux, for example, it is determined that the detected temperature reaches the charging stop temperature in 90 minutes or around.

In the example shown in Table 1, the time taken before the detected temperature reaches the charging stop temperature is reduced to a minimum when the illuminance is at least 100000 lux and the solar battery panel-temperature is at least 50° C. In that case, it is determined that the detected temperature reaches the charging stop temperature in 10 minutes or around.

Further, when the current illuminance and temperature are low, it is determined that the detected temperature would not Here, an example where the temperature observed during charging performed through the solar battery of the terminal device is increased will be described with reference to FIGS. 5 and 6.

Figure 5:
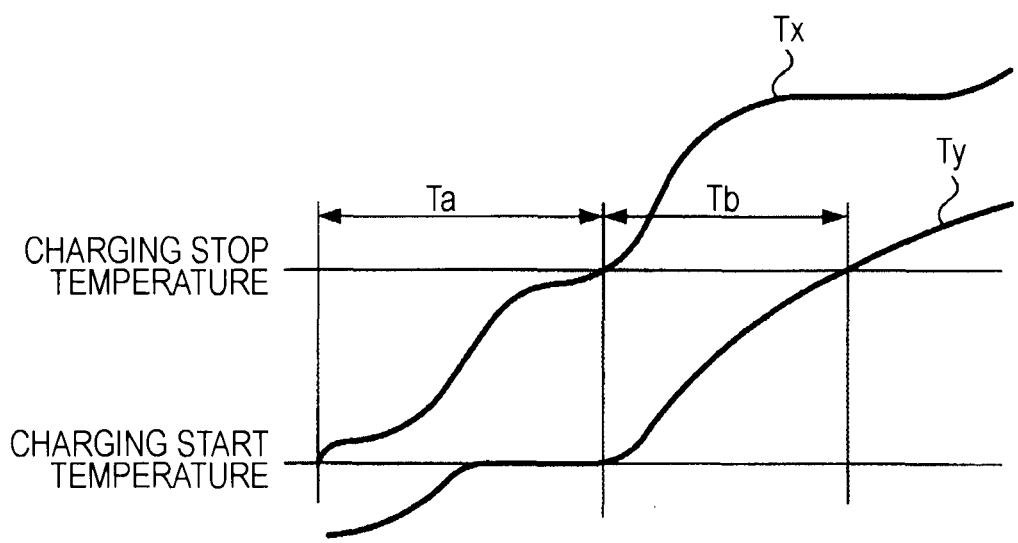
FIG. 5 is a principle diagram illustrating an exemplary relationship between a solar battery panel-temperature and a secondary battery-temperature according to an embodiment.

FIG. 5 illustrates the relationship between a solar battery panel temperature Tx and a secondary battery temperature Ty. In the terminal device 10, the solar battery panel 17 and the secondary battery 18 are provided in the cabinet 10a and 10b that are connected to each other, as illustrated in FIG. 2. Therefore, when the temperature Tx of the solar battery panel 17 provided on the face of the cabinet is increased, the temperature Ty of the secondary battery 18 provided in the terminal device 10 is also increased even though the increase in the temperature Ty lags behind that in the temperature Tx to a degree.

FIG. 5 exemplarily illustrates the case where a time Ta elapsed before the solar battery panel temperature Tx increases from the charging start temperature and reaches the charging stop temperature. In that case, when the solar battery is kept being irradiated with the sunlight in an almost steady state under the above-described conditions until a time Tb further elapses, the temperature Ty of the secondary battery 18 reaches the charging stop temperature. The delay time Tb is a time period of 15 minutes, for example. Consequently, each of the times that are illustrated in Table 1 is the sum of the time Ta and the time Tb.

Figure 6A:
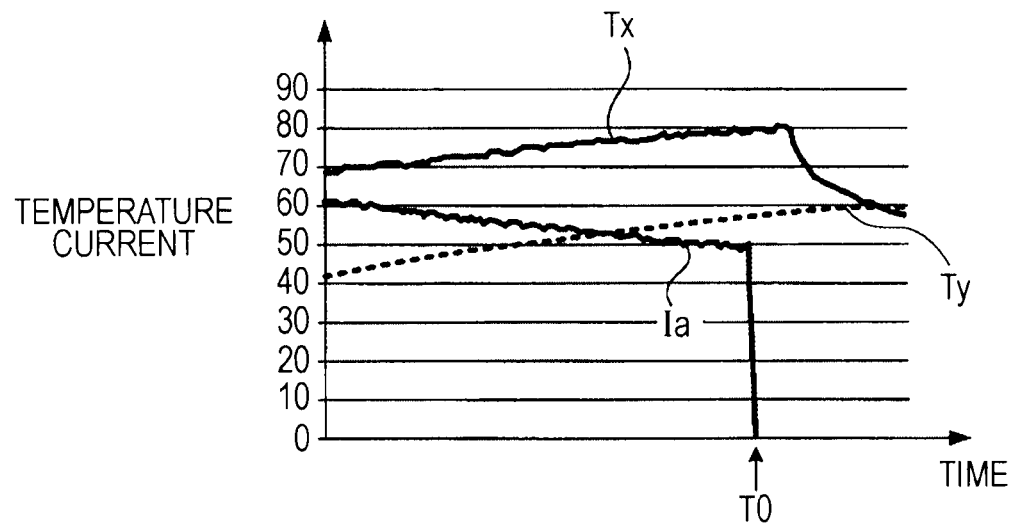
FIG. 6A is a characteristic diagram illustrating an specific example relationship between a solar battery panel temperature, a secondary battery temperature, and a charging current according to an embodiment.
Figure 6B:
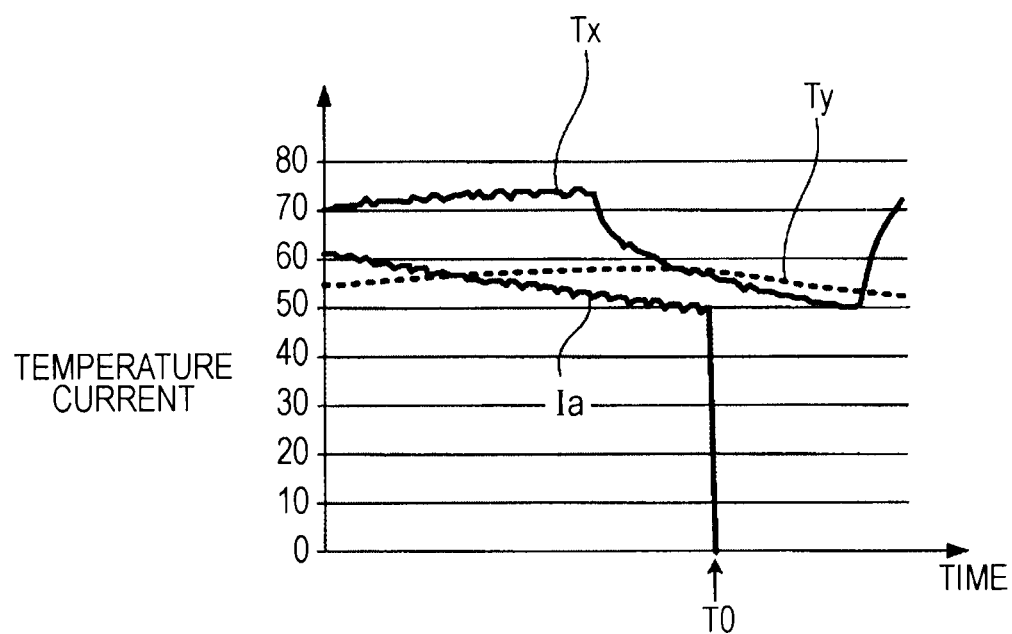
FIG. 6B is a different characteristic diagram illustrating an specific example relationship between a solar battery panel temperature, a secondary battery temperature, and a charging current according to an embodiment.

Each of FIGS. 6A and 6B illustrates the relationship between the solar battery temperature Tx, the secondary battery temperature Ty, and a charging current Ia transmitted to the secondary battery that are observed in the case where the charging is actually performed through the solar battery.

FIGS. 6A and 6B illustrate individual examples and the temperature at which the charging of the secondary battery is stopped is set to 58° C.

In an example illustrated FIG. 6A, the solar battery panel 17 is kept being irradiated with the sunlight. The secondary battery temperature Ty is increased with the same characteristics as those of the solar battery panel temperature Tx even though the increase in the temperature Ty lags behind that in the temperature Tx. Then, the charging is stopped at time T0 when the secondary battery temperature Ty reaches the charging stop temperature, and the value of the charging current becomes 0.

Since the temperature of the solar battery panel 17 is high, the secondary battery temperature Ty is slightly increased after the charging stopped. However, if the user moves the terminal device 10 to a place that does not get the sunlight at appropriate time after the charging is stopped, for example, the increase in the secondary battery temperature Ty can be reduced.

In an example illustrated FIG. 6B, the solar irradiation of the terminal device 10 is stopped slightly before the secondary battery temperature Ty reaches the charging stop temperature. In that case, the secondary battery temperature Ty also reaches the charging stop temperature due to the high temperature of the solar battery panel 17. After that, however, the secondary battery temperature Ty is reduced in a relatively short time period.

Thus, according to the terminal device 10 of the above-described embodiment, the charging performed through the solar battery is started, and the user is notified of an estimated time taken before the battery temperature reaches the charging stop temperature through display and/or voice. Therefore, the user stops the solar irradiation of the terminal device 10 based on the estimated time, which prevents the terminal device 10 from being held at a high temperature. Consequently, it becomes possible to reduce deterioration of the battery and/or the circuit components that are provided in the terminal device 10, the deterioration occurring because the terminal device is held at a high temperature. The above-described embodiment is particularly convenient because the user is notified of the time taken before the charging performed through the solar battery is stopped when the charging is started. Namely, when the user starts charging the terminal device 10 and leaves the terminal device 10 at the window, for example, the user can determine how much time the user should wait before collecting the terminal device 10 so long as the user confirms the initial notification in beforehand.

[4. Example Modifications]

In the above-described embodiment, the illuminance sensor 25 is fixed to the cabinet of the terminal device 10 to determine the secondary battery temperature based on the illuminance detected through the illuminance sensor 25 and the solar battery temperature detected through the panel temperature detection-temperature sensor 24. On the other hand, the illuminance of the sunlight with which the solar battery is irradiated may be estimated through a mechanism or the like other than the illuminance sensor 25.

For example, calculation processing may be performed by detecting the amount of power generated through the solar battery panel (generated currents) and estimating the illuminance of the sunlight with which the solar battery panel 17 is irradiated based on the detected generated power amount to calculate the time taken before the secondary battery temperature reaches the charging stop temperature based on the estimated illuminance and a measured temperature.

Further, for calculating the temperature at which the charging of the secondary battery is stopped, the date and time of the calculation may be determined to make a revision. For example, when the calculation time is relatively near the sunset time such as 4 p.m., a decrease in the illuminance of the sunlight observed in the time period of from the current time to the sunset time may be estimated and an estimated value of an increase in the temperature may be revised downward. Conversely, when the current time is near the sunrise time such as 7 a.m., it may be estimated that the illuminance would be increased as time passes thereafter and the estimated value of the temperature increase may be revised upward. Since the time of the sunrise and/or the sunset is changed in accordance with the date, the above-described revisions should be made based on the date in place of the time.

The above-described embodiment is exemplarily applied for the mobile phone-terminal device on which the solar battery panel is mounted. However, the above-described embodiment may be applied for a different terminal on which the solar battery panel is mounted, such as a portable reproducing device to which the solar battery panel is affixed, the portable reproducing device being configured to reproduce audio/video data.

When the above-described embodiment is applied for the mobile phone-terminal device, the shape of the mobile phone-terminal device illustrated in FIG. 2, which is exemplarily illustrated, may be changed so that the mobile phone-terminal device may include a cabinet having a different shape. For example, the mobile phone-terminal device may be a terminal device having a single cabinet on which the solar battery panel is provided in place of the two cabinets that are connected to each other as illustrated in FIG. 2.

Further, a program arranged to perform the processing method of the above-described embodiment may be installed in a terminal device attained through a related art, the terminal device being provided with a solar battery, so that the terminal device attained through the related art can perform the same processing method as that of the above-described embodiment. The program (software) may be downloaded to the terminal device through radio communications or the like for distribution.

As each of the relationships between the times taken before the charging is stopped, the temperatures, and the illuminances that are illustrated in the table or the like has been exemplarily described, the relationship is changed due to the configuration of the terminal device, and the size of each of the solar battery panel and the secondary battery, for example. Therefore, it should be configured that an appropriate value of the relationship can be calculated for each of actual terminal devices.

It should be understood by those skilled in the art that various modifications, combinations, sub-combinations and alterations may occur depending on design requirements and other factors insofar as they are within the scope of the appended claims or the equivalents thereof.

What is claimed is:

1. A method, implemented on a terminal device having a solar battery panel and a secondary battery that is charged through power generated through the solar battery panel, comprising:
    detecting a temperature measured adjacent to the solar battery panel;
    detecting an illuminance measured adjacent to the solar battery panel;
    detecting a temperature measured adjacent to the secondary battery;

estimating a change in the temperature measured adjacent to the secondary battery based on the temperature measured adjacent to the solar battery panel and the illuminance measured adjacent to the solar battery panel, and determining a remaining time until the estimated temperature measured adjacent to the secondary battery reaches a temperature at which the charging of the secondary battery is stopped by comparing the temperature measured adjacent to the solar battery panel and the illuminance measured adjacent to the solar battery panel with predetermined stored data values; and providing a notification about the remaining time.

2. A computer readable storage medium that stores a program which, when executed by a terminal device having a solar battery panel and a secondary battery that is charged through power generated through the solar battery panel, causes the terminal device to perform a method comprising:

detecting a temperature measured adjacent to the solar battery panel;

detecting an illuminance measured adjacent to the solar battery panel;

detecting a temperature measured adjacent to the secondary battery;

estimating a change in the temperature measured adjacent to the secondary battery based on the temperature measured adjacent to the solar battery panel and the illuminance measured adjacent to the solar battery panel, and determining a remaining time until the estimated temperature measured adjacent to the secondary battery reaches a temperature at which the charging of the secondary battery is stopped by comparing the temperature measured adjacent to the solar battery panel and the illuminance measured adjacent to the solar battery panel with predetermined stored data values; and providing a notification about the remaining time.

* * * * *